(12) United States Patent
Hironaka et al.

(10) Patent No.: US 10,747,440 B2
(45) Date of Patent: Aug. 18, 2020

(54) STORAGE SYSTEM AND STORAGE SYSTEM MANAGEMENT METHOD

(71) Applicant: Hitachi, Ltd., Tokyo (JP)

(72) Inventors: Kazuei Hironaka, Tokyo (JP); Akira Yamamoto, Tokyo (JP); Yoshihiro Yoshii, Tokyo (JP); Mitsuo Hayasaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/121,785

(22) PCT Filed: Sep. 24, 2014

(86) PCT No.: PCT/JP2014/075236
§ 371 (c)(1),
(2) Date: Aug. 26, 2016

(87) PCT Pub. No.: WO2016/046911
PCT Pub. Date: Mar. 31, 2016

(65) Prior Publication Data
US 2017/0010809 A1 Jan. 12, 2017

(51) Int. Cl.
*G06F 12/02* (2006.01)
*G06F 3/06* (2006.01)

(52) U.S. Cl.
CPC ............ *G06F 3/061* (2013.01); *G06F 3/0641* (2013.01); *G06F 3/0659* (2013.01);
(Continued)

(58) Field of Classification Search
CPC .... G06F 12/023; G06F 3/0673; G06F 3/0665; G06F 3/0659; G06F 3/0641; G06F 3/061; G06F 12/02; G06F 3/06
(Continued)

(56) References Cited

U.S. PATENT DOCUMENTS 6,510,498 B1 * 1/2003 Holzle .................. G06F 9/4862
711/153
8,068,512 B2 * 11/2011 Nitta ........................ G06F 3/061
370/465
(Continued)

OTHER PUBLICATIONS

Roland Tretau, "IBM System Storage N series Clustered Data ONTAP", An IBM Redbooks Publication, Jun. 2014.*
(Continued)

*Primary Examiner* — Pierre Miche Bataille
(74) *Attorney, Agent, or Firm* — Mattingly & Malur, PC

(57) ABSTRACT

It is provided a storage system comprising at least one controller and a storage device. The at least one controller verifies, for each predetermined storage area within a logical volume provided to the host computer, whether data of the each predetermined storage area is duplicated to another storage area. The storage device holds unshared data associated only with the storage area and shared data associated with the storage area and the another storage area in the case where the data of the each predetermined storage area is identical to the data of the another storage area. The at least one controller reads the unshared data in the case where a request to read the data is received under a state in which the unshared data and the shared data are held, and releases an area in which the unshared data is stored at predetermined timing.

22 Claims, 13 Drawing Sheets

(52) U.S. Cl.
CPC .......... G06F 3/0665 (2013.01); G06F 3/0673 (2013.01); G06F 12/023 (2013.01); *G06F 2212/1016* (2013.01); *G06F 2212/152* (2013.01); *G06F 2212/154* (2013.01); *G06F 2212/163* (2013.01); *G06F 2212/261* (2013.01); *G06F 2212/263* (2013.01); *G06F 2212/312* (2013.01)

(58) Field of Classification Search
USPC .................................................. 711/154, 147
See application file for complete search history.

(56) References Cited

U.S. PATENT DOCUMENTS

| | | | | |
|---|---|---|---|---|
| 8,639,658 | B1* | 1/2014 | Kumaresan | G06F 3/0641 707/609 |
| 9,152,628 | B1* | 10/2015 | Stacey | G06F 17/30153 |
| 9,229,853 | B2* | 1/2016 | Khan | G06F 3/0608 |
| 9,594,514 | B1* | 3/2017 | Bono | G06F 12/00 |
| 2008/0104446 | A1* | 5/2008 | Forrer, Jr. | G06F 11/0727 714/6.2 |
| 2011/0231580 | A1* | 9/2011 | Nakamichi | G06F 3/0605 710/9 |
| 2012/0131287 | A1* | 5/2012 | Nishina | G06F 11/2069 711/154 |
| 2013/0226881 | A1 | 8/2013 | Sharma et al. | |
| 2014/0237179 | A1* | 8/2014 | Iwamura | G06F 11/2076 711/114 |
| 2016/0342490 | A1* | 11/2016 | Deguchi | G06F 11/2058 |
| 2017/0115883 | A1* | 4/2017 | Muppalaneni | G06F 12/1009 |

OTHER PUBLICATIONS

J. Srikrishnan et al., "Sharing FCP adapters through virtualization," in IBM Journal of Research and Development, vol. 51, No. 1.2, pp. 103-118, Jan. 2007.*
International Search Report of PCT/JP2014/075236 dated Nov. 18, 2014.

* cited by examiner

| WWN | LUN | POOL# | LU CAPACITY | CONSUMED LU CAPACITY |
|---|---|---|---|---|
| 50:00:08:70:00:30:06:9a | 00 | 0 | 30GB | 10GB |
| 50:00:08:70:00:30:06:c6 | 01 | 0 | 30GB | 20GB |
| 50:00:08:70:00:30:06:9c | 02 | 0 | 60GB | 30GB |
| 50:00:08:70:00:30:06:d0 | 03 | 2 | 60GB | 10GB |
| ⋮ | | | | |

LU MANAGEMENT TABLE 500

*FIG. 5*

| LBA | POOL LBA |
|---|---|
| 000000000000 | 000000120000 |
| 000000040000 | - |
| 000000080000 | 000000480000 |
| 0000000C0000 | 000000240000 |
| ⋮ | |

LU LOGICAL ADDRESS MANAGEMENT TABLE 600

*FIG. 6*

| | | | | OFFSET | | | | | | |
|---|---|---|---|---|---|---|---|---|---|---|
| | | | | +00000 | | +02000 | | ... | +3E000 | |
| Pool LBA | DEDUP FLAG | CAPACITY REDUCIBLE FLAG | BLOCK READ COUNT | CHUNK 0 (PRIMARY) LBA | CHUNK 0 (SECONDARY) LBA | CHUNK 1 (PRIMARY) LBA | CHUNK 1 (SECONDARY) LBA | | CHUNK 31 (PRIMARY) LBA | CHUNK 31 (SECONDARY) LBA |
| 000000000000 | 0 | 1 | 5 | 000000000000 | 00216b24c000 | 000000002000 | — | | 00000003E000 | 031352184000 |
| 000000040000 | 1 | 0 | 1 | 000000040000 | — | 000000042000 | — | | 00000007E000 | — |
| 000000080000 | 1 | 0 | 0 | — | 00216b24c000 | — | 03de9cbb0000 | | — | — |
| 0000000C0000 | 0 | 0 | 0 | — | — | — | — | | — | 031352184000 |
| ... | | | | | | | | | | |

POOL LOGICAL ADDRESS MANAGEMENT TABLE 800

*FIG. 8*

| HASH VALUE | STORAGE LBA | SIZE | REF |
|---|---|---|---|
| 8c012f17378cef9be8d3d40317f80b14ae515f2d | 046c46934000 | 8192 | 1 |
| 31797b95d6d187352da48220e3489cbcbe497f14 | 00027a2f8000 | 8192 | 1 |
| 05f92e80dc93f9ec15e011b08cbf0ebca21fd891 | 0154f2240000 | 8192 | 2 |
| 758bb2b4a645e110071347c4e4c5b07c2c1a5f40 | 081ee9676000 | 8192 | 8 |
| 51efd44687a4164d82b9d04bfa87a188e3eb4f8b | 0182910f6000 | 8192 | 0 |
| ⋮ | | | |

CHUNK MANAGEMENT TABLE 900

FIG. 9

| RAID# | RAID Level | DRIVE NUMBER |
|---|---|---|
| 1 | 10 | 0, 1, 2, 3 |
| 2 | 5 | 4, 5, 6, 7 |
| 3 | 5 | 8, 9, 10, 11 |
| 4 | 6 | 12, 13, 14, 15 |
| ⋮ | | |

RAID DEVICE MANAGEMENT TABLE 1000

FIG. 10

FIG. 11 DEDUPLICATION PROCESSING FLOW

POOL CONSUMED CAPACITY CALCULATION PROCESSING FLOW

STORAGE SYSTEM AND STORAGE SYSTEM MANAGEMENT METHOD

BACKGROUND

This invention relates to a storage system.

In recent years, there has been a steep increase in data amount accumulated in companies, and thus there has been a strong need for a storage apparatus capable of storing a large amount of data at a low cost. Accordingly, a data amount reduction technology for reducing an amount of data stored in the storage apparatus to reduce the cost of the storage apparatus is attracting attention. As such a data amount reduction technology, there is known a deduplication technology involving finding a data string identical to another data string from among data strings stored in the storage apparatus and eliminating a redundant data string, to thereby reduce an amount of data stored in the storage apparatus.

In US 2013/0226881 A1, the following deduplication technology is disclosed. Specifically, in a storage apparatus capable of accessing data on a file-by-file basis, when a host coupled to the storage apparatus stores a file, it is detected whether or not a data string of the file to be stored is identical to another data string stored in the storage apparatus. A data string that is different from any other data string is stored in the storage apparatus. Meanwhile, a duplicated data string is not stored in the storage apparatus, but is managed as mapping information for mapping a storage address of another duplicated data string stored in the storage apparatus. In this manner, the amount of data stored in the storage apparatus is reduced.

In the deduplication technology described above, a logical address for which duplication is detected is managed in association with a storage address of a shared data string that is referred to from other logical addresses within the storage apparatus. Thus, data strings stored in the storage apparatus are stored in a plurality of addresses in the order irrelevant to the order in which the host computer stores the data strings in the storage apparatus. As a result, fragmentation occurs. Therefore, when the host computer coupled to the storage apparatus reads data stored in the storage apparatus after the deduplication, in the storage apparatus, data is randomly read from a plurality of addresses, to thereby restore the original data string. For example, I/O performance of a hard disk drive (HDD), which is a storage medium for storing data, is lower in random read access than in sequential read access due to a constraint caused by its operation principle. Thus, I/O performance of the storage apparatus deteriorates.

In order to solve the problem described above, in US 2013/0226881 A1, the following technology is disclosed. Specifically, an access frequency that is based on a file accessed by the host and a level of fragmentation within the storage apparatus are monitored in advance before deduplication is executed, and when the level of fragmentation is high, the deduplication processing is not executed, to thereby prevent deterioration of I/O performance of the storage apparatus. Further, hitherto, the problem of deterioration of I/O performance can be alleviated by using, as a storage medium of the storage apparatus, a solid state drive (SSD) using a semiconductor memory as a storage medium, a storage medium having high random access performance or a large-capacity cache memory.

SUMMARY

However, in order to satisfy the need of markets to store a large amount of data at a low cost in a storage apparatus with the related art described above, HDDs are the most inexpensive and large-capacity storage media, and are thus optimal storage media satisfying the need. For this reason, there has been desired a deduplication technology capable of suppressing deterioration of I/O performance through use of the storage apparatus having HDDs as its storage media.

In addition, it has been desired that a storage area be effectively used while suppressing deterioration of I/O performance of deduplicated logical volumes.

The representative one of inventions disclosed in this application is outlined as follows. There is provided a storage system, which is configured to read and write data in accordance with a request from a host computer, comprising at least one controller including a processor configured to process reading and writing the data, and a storage device configured to store the data to be read or written. The at least one controller verifies, for each predetermined storage area within a logical volume provided to the host computer, whether data of the each predetermined storage area is duplicated to another storage area. The storage device holds unshared data associated only with the storage area and shared data associated with the storage area and the another storage area in the case where the data of the each predetermined storage area is identical to the data of the another storage area. The at least one controller reads the unshared data in the case where a request to read the data is received under a state in which the unshared data and the shared data are held, and releases an area in which the unshared data is stored at predetermined timing.

According to the representative embodiment of this invention, sequential read performance of a volume to which the deduplication is applied can be enhanced. Other objects, configurations, and effects than those described above become clear through the following description of embodiments.

BRIEF DESCRIPTION OF THE DRAWINGS

FIG. 5 is a diagram for illustrating an example of a configuration of an LU management table according to the first embodiment of this invention.

FIG. 6 is a diagram for illustrating an example of a configuration of an LU logical address management table according to the first embodiment.

FIG. 8 is a diagram for illustrating an example of a configuration of a pool logical address management table according to the first embodiment.

FIG. 9 is a diagram for illustrating an example of a configuration example of a chunk management table according to the first embodiment.

FIG. 10 is a diagram for illustrating an example of a configuration of the RAID device management table according to the first embodiment.

DETAILED DESCRIPTION OF THE PREFERRED EMBODIMENTS

Figure 1:
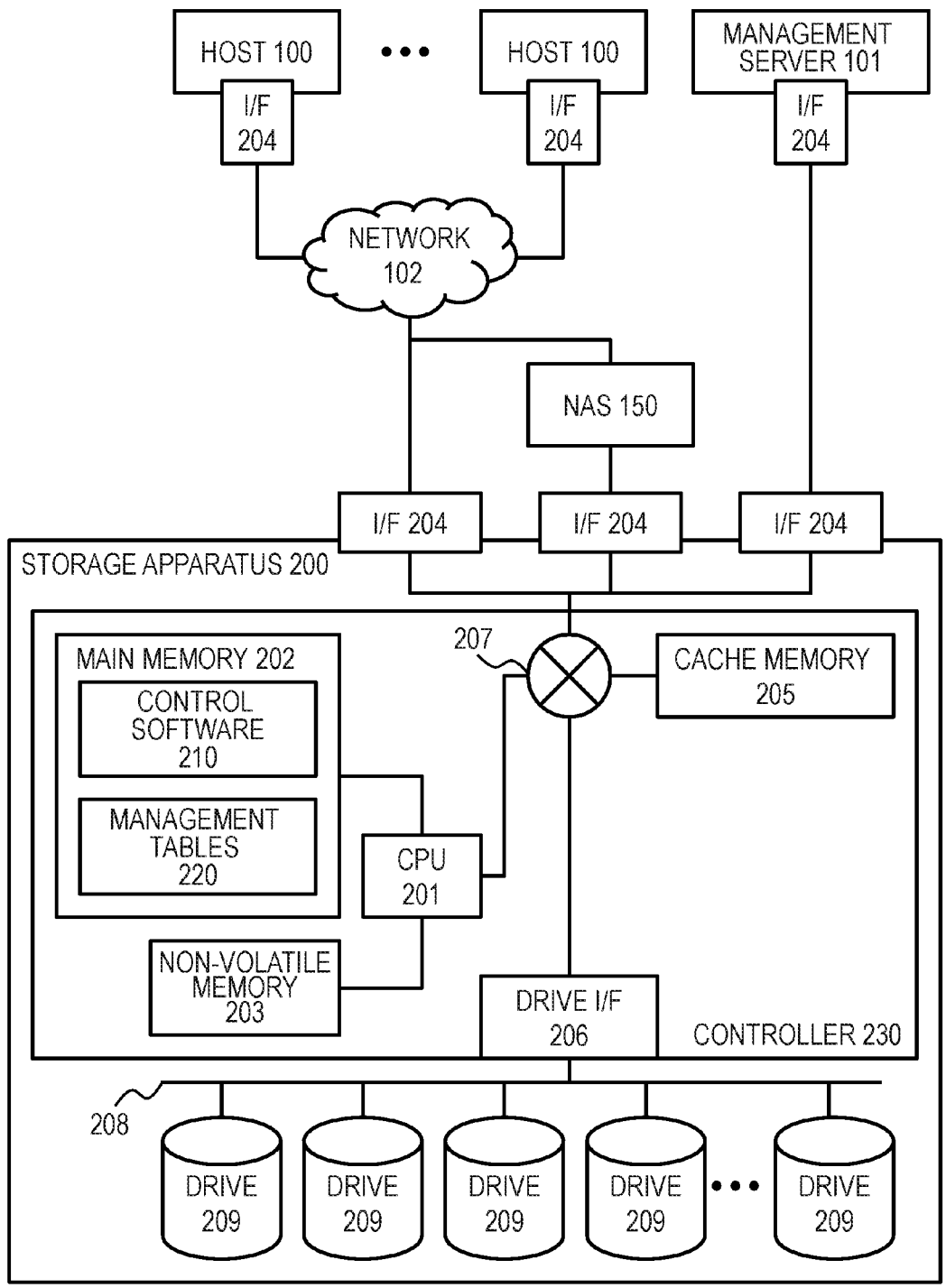
FIG. 1 is a diagram for illustrating an example of a configuration of a system including a storage apparatus and a host computer coupled to the storage apparatus according to a first embodiment of this invention.

Now, embodiments of this invention are described with reference to the accompanying drawings.

The embodiments to be described below do not limit the invention as defined in the appended claims. All the combinations of components described in the embodiments are not always necessary for solutions of this invention. In the following description, although pieces of information of this invention are described by using such expressions as "xxx table", "xxx list", "xxx DB", and "xxx queue", those pieces of information may be expressed by data structures other than a table, a list, a DB, a queue, and the like. Therefore, "xxx table", "xxx list", "xxx DB", "xxx queue", and the like are sometimes referred to as "xxx information" in order to show that those pieces of information are independent of their data structures.

In addition, although such expressions as "identification information", "identifier", "name", "ID" are used in order to describe details of each piece of information, those expressions are interchangeable.

In addition, the embodiments of this invention described later may be implemented by software running on a general purpose computer, by dedicated hardware, or by a combination of software and hardware.

In the following description, processing is sometimes described by using a "program" as a subject. However, the program is executed by a processor (e.g., central processing unit (CPU)), to thereby execute predetermined processing while using a storage resource (e.g., memory), a communication I/F, and a port. Thus, the processing may also be described by using a "processor" as a subject.

The processing described by using a "program" as a subject may also be processing performed by a computer including a processor (e.g., computing host or storage apparatus). Further, in the following description, the expression "controller" may refer to a processor or a hardware circuit configured to perform a part or all of processing procedures to be performed by the processor. Programs may be installed onto each computer from a program source (e.g., program distribution server or computer-readable storage medium). In this case, the program distribution server includes a CPU and a storage resource, and the storage resource stores a distribution program and a program to be distributed. The CPU of the program distribution server executes the distribution program, to thereby distribute the program to be distributed to other computers.

A management server includes input/output devices. As examples of the input/output devices, a display, a keyboard, and a pointer device are conceivable, but the input/output devices may be other devices. Moreover, a serial interface or an Ethernet interface may be used as an input/output device as an alternative to the input/output devices, and input and display on the input/output devices may be substituted by coupling, to the interface, a computer for display including a display, a keyboard, or a pointer device, transmitting information for display to the computer for display, and receiving information for input from the computer for display, thereby performing display on the computer for display and receiving the input from the computer for display.

Prior to descriptions of configurations of the embodiments of this invention, an outline of the embodiments is described.

Figure 3A:
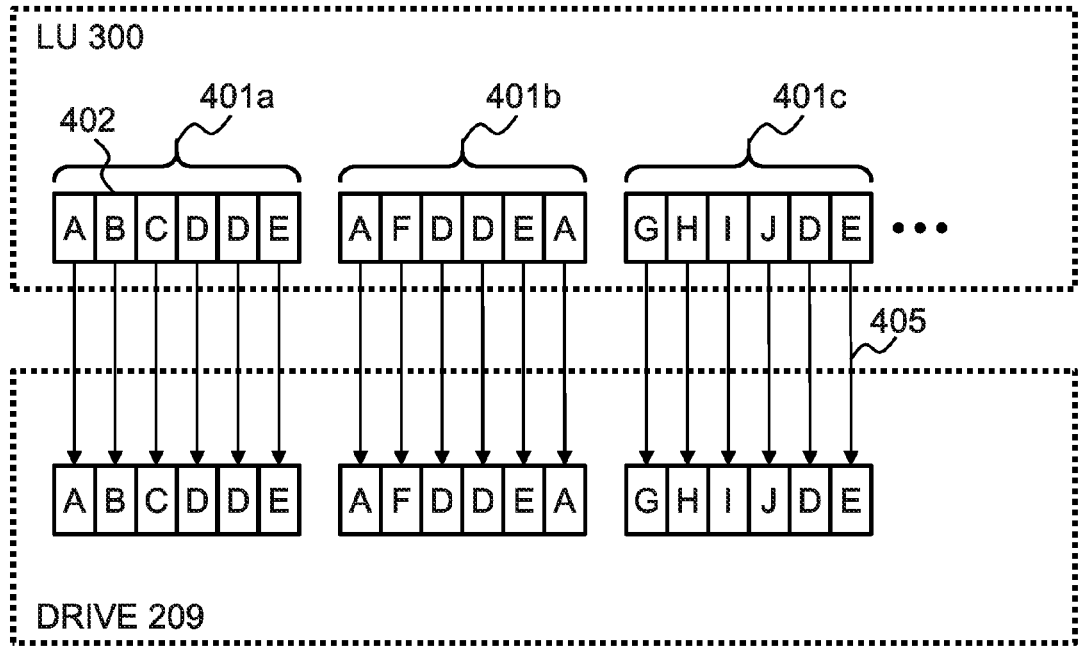
FIG. 3A is a diagram for illustrating a relation between logical addresses and arrangement of pieces of data in a drive when the data is not deduplicated.
Figure 3B:
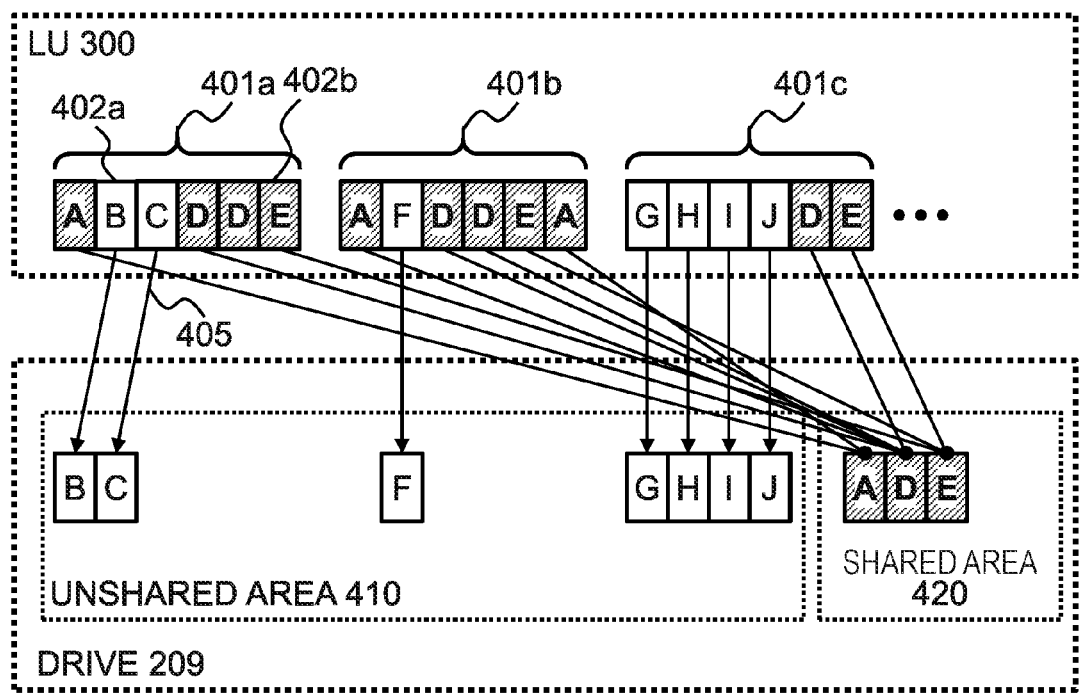
FIG. 3B is a diagram for illustrating a relation between logical addresses and arrangement of pieces of data in the drive after the data is normally deduplicated.
Figure 3C:
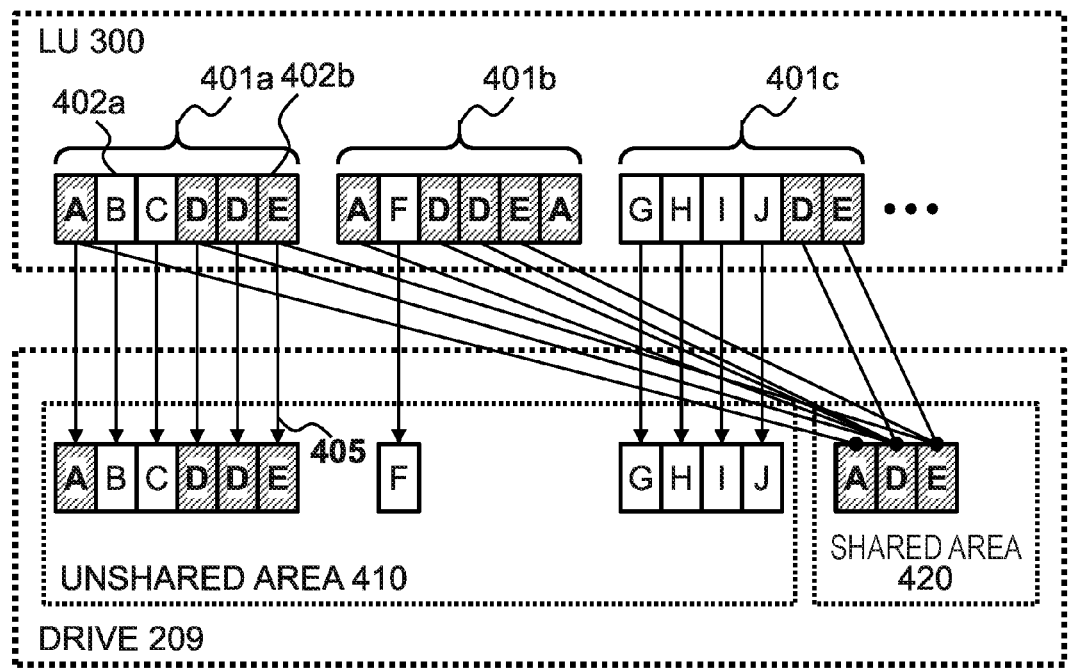
FIG. 3C is a diagram for illustrating a relation between logical addresses and arrangement of pieces of data in the drive after the data is deduplicated according to the first embodiment.

FIG. 3A, FIG. 3B, and FIG. 3C are diagrams for illustrating processing of storing, in a drive 209, data blocks written by a host computer 100 into a logical volume LU 300.

FIG. 3A is an illustration of a relation between logical addresses and arrangement of pieces of data in the drive when the data is not deduplicated. When the host computer 100 writes data blocks 401$a$, 401$b$, and 401$c$ into the logical volume LU 300, the data blocks 401$a$, 401$b$, and 401$c$ are stored in the drive 209 through a plurality of times of address conversion within a storage apparatus 200. In this case, the storage apparatus may include storage devices different from one another in performance to form tiers corresponding to the respective levels of performance. The logical volume LU 300 is a logical volume, and an actual data string is stored in the drive 209. Thus, the logical addresses of the logical volume LU 300 and storage addresses of the data blocks 401$a$, 401$b$, and 401$c$ stored in the drive 209 are associated with each other by pointers 405.

Chunks 402 constructing the data blocks 401$a$, 401$b$, and 401$c$ stored in the drive 209 are stored in the same order as that of the logical addresses of the logical volume LU 300. In other words, the chunks 402 corresponding to the data block 401$a$ are arrayed in consecutive areas of the drive 209, and hence the host computer 100 can read the data block 401$a$ with one read access.

FIG. 3B is an illustration of a relation between the logical addresses and the arrangement of pieces of data in the drive after the data illustrated in FIG. 3A is deduplicated. Deduplication processing involves verifying, for each chunk 402 stored in the drive 209, whether or not the chunk 402 is identical to another chunk 402. In this case, the chunk 402 for which data duplication is not detected is managed as a non-duplicated chunk 402$a$, and the chunk 402 for which data duplication is detected is managed as a duplicated chunk 402$b$. The deduplication processing further involves storing the duplicated chunk 402$b$ in a shared area 420 of the drive 209 and storing the non-duplicated chunk 402$a$ in an unshared area 410 of the drive 209. Further, for each chunk 402, the logical address of the logical volume LU 300 and the storage address of the drive 209 are associated with each other by the pointer 405. As used herein, the "unshared area" is an area for storing a chunk to which the deduplication is not applied. Meanwhile, the "shared area" is an area for storing a chunk referred to from two or more logical addresses as a result of being applied with the deduplication.

As described above, with the deduplication processing, a consumed capacity of the drive 209 can be reduced by storing data while eliminating a redundant chunk 402 stored in the drive 209. Meanwhile, the storage addresses of the chunk 402 stored in the drive 209 are not arrayed in the same order as that of the logical addresses of the logical volume LU 300. Thus, for example, in order to read the data block 401a, the chunks 402 corresponding to the data block 401a stored in the drive 209 need to be read from a plurality of addresses of the drive 209, and random read access needs to be made to the drive 209 a plurality of times. Accordingly, sequential read performance becomes lower than in the case illustrated in FIG. 3A.

In view of the above, the embodiments of this invention solve the deterioration of sequential read performance after deduplication.

Referring to FIG. 3C, an outline of the embodiments of this invention is described.

In FIG. 3C, the data stored in the drive 209 is deduplicated in the same manner as in FIG. 3B. In this embodiment, for each data block of the logical volume LU 300, the number of times the entire data block has been read during a period from when the data block is stored in the drive 209 to when the data block is deduplicated (block read count) is counted, and the block read count is stored for each data block. Then, when a data block is deduplicated, a deduplication method is changed depending on the block read count of the data block.

For example, a case is considered in which the entire data block 401a is accessed to be read before being deduplicated. In the deduplication, when the data block 401a is deduplicated, the block read count of the data block 401a is checked after duplication of the chunks 402 constructing the data block 401a is verified. When the block read count is large, the duplicated chunk 402b is left as it is without eliminating the duplicated chunk 402b from the chunks corresponding to the data block 401a that are stored in the unshared area 410 of the drive 209. Next, two pointers 405 for associating the address of the logical volume LU 300 with the chunk storage addresses of the drive 209 are created. In other words, the address of the logical volume LU 300 are associated with two addresses of the unshared area 410 of the drive 209 and the duplicated chunk of the shared area 420. In this manner, data in which chunks are arrayed in the same order as that of the addresses of the chunks of the data block 401a of the logical volume LU 300 is stored in the drive 209. Therefore, the number of times of access to the drive 209 required for reading the block is reduced, and hence the sequential read performance is improved.

Further, for example, when the duplicated chunk stored in the unshared area 410 is eliminated after the capacity of the drive 209 is depleted, in the deduplication according to the embodiments of this invention, the chunk has the pointer 405 to the duplicated chunk of the shared area 420. Thus, without the need to verify duplication of the data block 401a again, the duplicated chunk of the shared area 420 can be eliminated only by removing the pointer 405 indicating the duplicated chunk of the shared area 420 out of two pointers 405 corresponding to the data block 401a.

Meanwhile, when the block read count is small before the deduplication (e.g., the entire data block is not read), the data stored in the drive 209 is reduced with the related-art deduplication processing described with reference to FIG. 3B.

<First Embodiment>

FIG. 1 is a diagram for illustrating an example of a configuration of a system including the storage apparatus 200 and the host computers 100 coupled to the storage apparatus 200 according to a first embodiment of this invention.

In the system illustrated in FIG. 1, the host computers 100 are coupled to the storage apparatus 200 via interfaces (I/Fs) 204 and a network 102. Further, the host computers 100 are coupled to the storage apparatus 200 via the interfaces (I/Fs) 204, a file server (NAS) 150, and the network 102. Further, a management server 101 is coupled to the storage apparatus 200 via the network 102.

The host computer 100 is, for example, a computer constructed with a general server or a mainframe, and is configured to execute processing through use of data stored in the storage apparatus 200.

The network 102 is constructed with, for example, a storage area network (SAN) or Ethernet.

The storage apparatus 200 includes a controller 230 and a plurality of drives 209. The controller 230 includes a CPU 201, a main memory 202, a non-volatile memory 203, the I/Fs 204 of the storage apparatus, a cache memory 205, and a drive I/F 206. Those devices are coupled to one another via an internal bus 207.

The management server 101 is a computer configured to manage the storage apparatus 200 coupled to the management server 101 via the I/F 204 and the network 102. The management server 101 is configured to execute management software to be used by an administrator to manage the storage apparatus 200, and to communicate to/from management tables 220 and control software 210 executed by the CPU 201 on the main memory 202 of the storage apparatus 200, to thereby monitor a state of the storage apparatus 200 and change settings of the storage apparatus 200.

The main memory 202 is configured to store the control software 210 for controlling the storage apparatus 200, the management tables 220 required for the control, and others. The CPU 201 is configured to execute processing in accordance with contents of the control software 210 and the management tables 220 stored in the main memory 202. Further, the CPU 201 is configured to control data transfer among the drives 209, the cache memory 205, and the I/Fs 204 via the drive I/F 206 based on a read instruction and a write instruction issued from the host computer 100 and to execute deduplication processing on data.

The non-volatile memory 203 is configured to store the control software 210 executed by the CPU 201 and all or a part of the management tables 220. When the storage apparatus 200 is powered on, the CPU 201 loads the control software 210 and the management tables 220 stored in the non-volatile memory 203 onto the main memory 202, and executes the control software 210.

The cache memory 205 is a storage area constructed with, for example, a dynamic random access memory (DRAM) or a static random access memory (SRAM), which can be accessed at high speed. The cache memory 205 is used as a data area for temporarily caching data transmitted/received by the storage apparatus 200 to/from the host computer 100 and data input/output to/from the drives 209 and as an area for storing management data required for the execution of the control software 210 and others. This operation of the cache memory 205 enhances throughput and responsiveness in I/O processing by the storage apparatus 200.

The drive I/F 206 is an interface for coupling the controller 230 to the drives 209. For example, the controller 230 is coupled to the drives 209 by a connection bus 208, e.g., a serial attached SCSI (SAS), a serial ATA (SATA), a fibre channel (FC), or a peripheral component interconnect-express (PCI-Express).

The drives 209 are each a data recording device coupled to the storage apparatus 200, and are each constructed with, for example, a magnetic disk drive (HDD) or a non-volatile semiconductor storage device (SSD).

Figure 2:
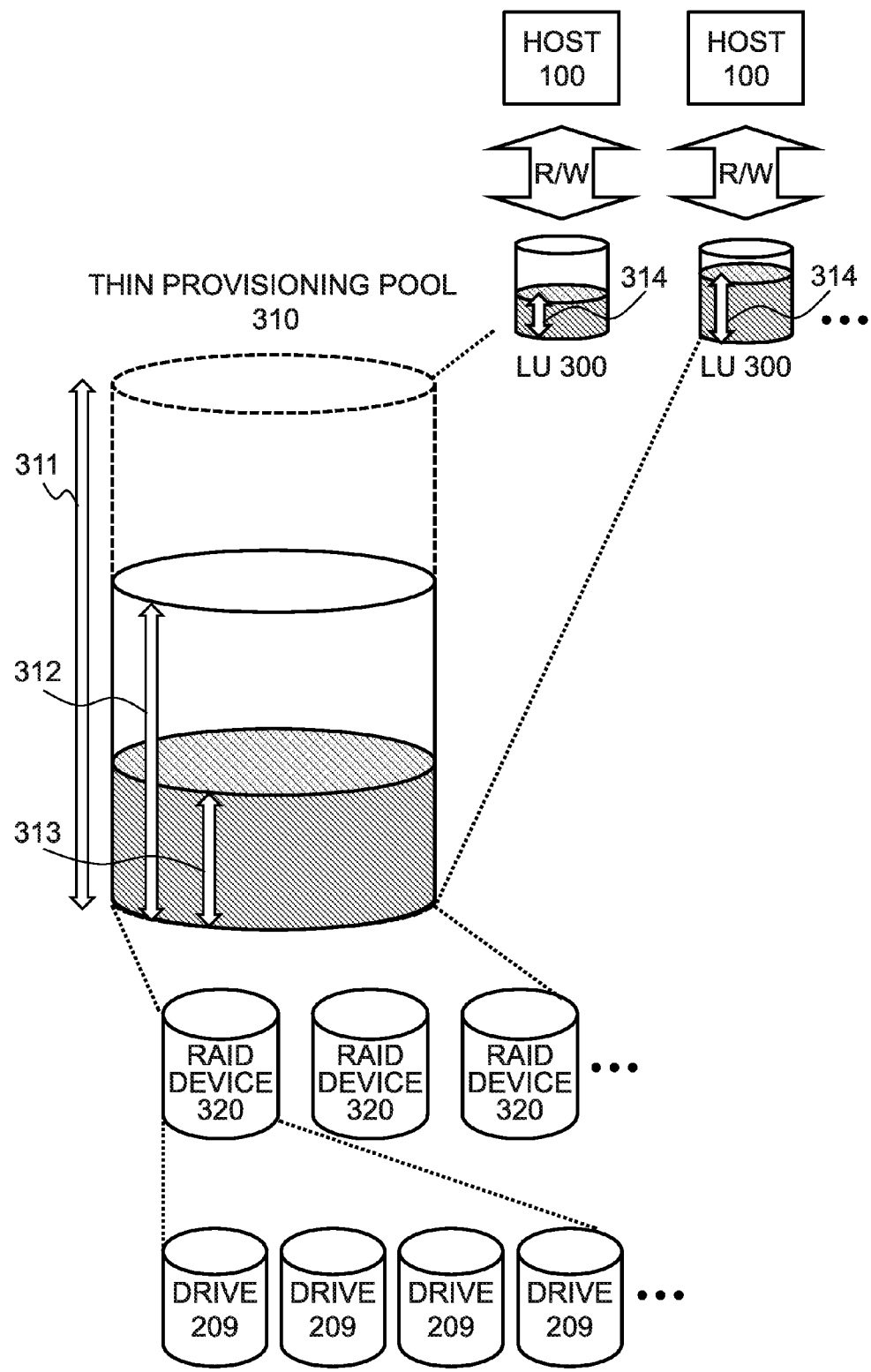
FIG. 2 is a diagram for illustrating a volume configuration in thin provisioning of the storage apparatus according to the first embodiment.

FIG. 2 is a diagram for illustrating a volume configuration in thin provisioning of the storage apparatus 200 according to the first embodiment of this invention.

A thin provisioning function in this application is a function of cutting out a storage area (logical volume) from a thin provisioning pool 310, which has a logical capacity larger than a physical capacity implemented in the storage apparatus 200, and providing the storage area to the host computer 100. The thin provisioning function is also a technology for adding a physical capacity to the storage apparatus 200 depending on a consumed capacity of the thin provisioning pool 310, to thereby reduce an initial investment cost of the storage apparatus 200.

For example, as illustrated in FIG. 2, the storage apparatus 200 provides a plurality of logical volume logical units (LUs) 300 to a plurality of host computers 100. The logical volume LUs 300 are managed through use of, for example, an LU management table 500 shown in FIG. 5. Each of the host computers 100 requests the logical volume LU 300 to read/write data, thereby being capable of reading/writing data from/to the drive 209 coupled to the storage apparatus 200.

A pool capacity 311 of the thin provisioning pool 310 is a logical capacity that can be allocated to the logical volume LUs 300. An allocated pool capacity 312 is a capacity up to which the thin provisioning pool 310 can actually store data, and is a total capacity of RAID devices 320 allocated to the thin provisioning pool 310.

The RAID devices 320 are each constructed with a plurality of drives 209 constructing a redundant array of inexpensive disks (RAID).

A logical consumed capacity 313 is a capacity that is actually allocated to a logical volume to be consumed out of the logical capacity within the thin provisioning pool 310. The logical consumed capacity 313 is equal to a sum of consumed capacities 314 of the logical volume LUs 300 cut out from the thin provisioning pool 310.

The thin provisioning function enables a user to allocate a pool capacity to the logical volume LU 300 up to the pool capacity 311 of the thin provisioning pool 310. Therefore, when the consumed capacity 314 of the logical volume LU 300 increases, the logical consumed capacity 313 also increases. As a result, the allocated pool capacity 312 of the thin provisioning pool 310 becomes insufficient. In view of this, the control software 210 executed by the CPU 201 monitors a difference between the allocated pool capacity 312 and the logical consumed capacity 313. Then, when the difference between the allocated pool capacity 312 and the logical consumed capacity 313 becomes smaller than a predetermined threshold, the storage apparatus 200 alerts the management server 101 to a decrease in free capacity. At this time, for example, through addition of a storage capacity of the RAID device 320 to the thin provisioning pool 310 based on an instruction from the administrator, the allocated pool capacity 312 is increased, and a capacity shortage is thus solved.

A plurality of thin provisioning pools 310 may be provided so as to correspond to the respective types of drives 209, and each of the thin provisioning pools 310 may form a tier. As another example, the thin provisioning pool 310 may be constructed for each tier. In this case, a specific tier (thin provisioning pool) may be subjected to the deduplication processing. For example, the thin provisioning pool 310 constructed with a flash medium (solid state drive (SSD)) from/to which data can be read/written at high speed may be subjected to the normal deduplication illustrated as an example in FIG. 3B, and may not be subjected to the deduplication processing according to this embodiment capable of reducing the capacity.

Figure 4:
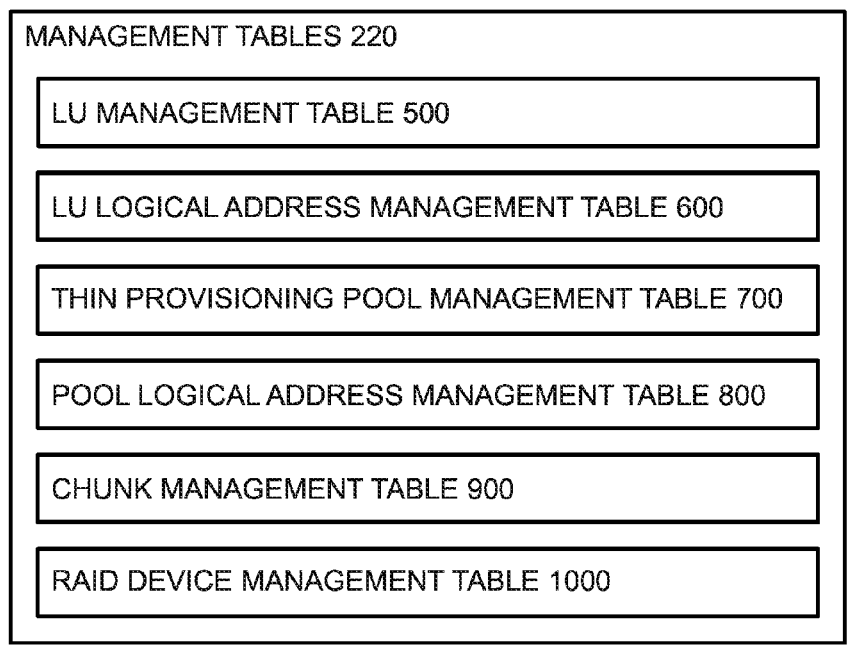
FIG. 4 is a diagram for illustrating a configuration of a management tables stored in a main memory of the storage apparatus according to the first embodiment.

FIG. 4 is a diagram for illustrating a configuration of the management tables 220 stored in the main memory 202 of the storage apparatus 200.

The management tables 220 include the LU management table 500, an LU logical address management table 600, a thin provisioning pool management table 700, a pool logical address management table 800, a chunk management table 900, and a RAID device management table 1000. Now, those tables are described.

FIG. 5 is a diagram for illustrating an example of a configuration of the LU management table 500.

The LU management table 500 is a table for managing correspondence between the logical volume LU 300 provided by the storage apparatus 200 and the host computer 100, and the capacity of the logical volume LU 300.

A world wide name (WWN) 501 is a unique value assigned to each of the host computers 100, and is used to identify the host computer 100. A LUN 502 is an identification number of the logical volume LU 300 provided to the host computer 100. A POOL number (POOL#) 503 is a number of the thin provisioning pool 310 associated with the LU 300 having an identification number of the LUN 502. A LU capacity 504 is a capacity of the logical volume LU 300 provided to the host computer 100. The consumed capacity 314 of the logical volume LU 300 is a capacity used by the logical volume LU 300 provided to the host computer 100.

For example, when a new host computer 100 is coupled to the storage apparatus 200 and a new logical volume LU 300 is allocated to the new host computer 100, the administrator sets, through the management software executed by the management server 101, the WWN 501, the LUN 502, the POOL#502, and the LU capacity 504 of the host computer 100 in the LU management table 500. This enables a new logical volume LU 300 to be allocated to the host computer 100.

FIG. 6 is a diagram for illustrating an example of a configuration of the LU logical address management table 600.

The LU logical address management table 600 is a table for managing correspondence between a logical address 601 of the logical volume LU 300 provided by the storage apparatus 200 and a logical address 602 of the thin provisioning pool 310, and this correspondence is managed for each LU 300.

When the host computer 100 accesses the logical address of the logical volume LU 300, the storage apparatus 200 assigns an arbitrary logical address of the thin provisioning pool 310 to the logical address 601 of the LU 300. In this manner, a storage area is allocated to an access target area of the LU 300 from the pool.

Figure 7:
FIG. 7 is a diagram for illustrating an example of a configuration of a thin provisioning pool management table according to the first embodiment.

FIG. 7 is a diagram for illustrating an example of a configuration of the thin provisioning pool management table 700.

The thin provisioning pool management table 700 is a table for managing the thin provisioning pool 310. A POOL#701 is a number for uniquely identifying the thin provisioning pool 310. A RAID#702 is a number of the RAID device 320 having a storage area for providing the thin provisioning pool 310. For example, when a new thin provisioning pool 310 is created in the storage apparatus 200, the administrator sets, through the management software executed by the management server 101, a new POOL #701, the RAID #702 to be registered with the pool, and the pool capacity 311 in the thin provisioning pool management table 700, to thereby create the new thin provisioning pool 310. A physical consumed capacity 703 is an actual physical consumed capacity consumed to store deduplicated data out of the allocated pool capacity 312 of the thin provisioning pool 310.

FIG. 8 is a diagram for illustrating an example of a configuration of the pool logical address management table 800.

The pool logical address management table 800 is a table for managing correspondence between the logical address 801 of the thin provisioning pool 310 and the logical address of the drive 209 constructing the RAID device 320. In this table, the logical address is managed for each chunk (e.g., logical address area of every 8 kilobytes).

A pool LBA 801 is for managing an address space of the thin provisioning pool 310 for every arbitrary size (e.g., area of every 256 kilobytes), and is a head address of the area. A unit of management of the logical address 801 of the thin provisioning pool 310 is hereinafter referred to as "data block". In other words, the data block is a unit of management of data strings, and is formed of a plurality of chunks 402.

A dedup flag 802 is a flag indicating whether or not the data block has been deduplicated. When the dedup flag 802 is valid ("1"), the relevant data block is the one to be deduplicated. A capacity reducible flag 803 is a flag indicating, in the deduplication processing described later, a deduplicated data block whose capacity can be reduced when a drive capacity is depleted.

A block read count 804 is a flag indicating that the entire data block has been read before the deduplication. When a read range is the entire data block, "1" is added to the block read count 804. A primary chunk pointer 805 and a secondary chunk pointer 806 are logical addresses of the drive 209 constructing the RAID device 320 corresponding to each chunk constructing the data block.

In the description of the deduplication processing according to this embodiment, for each chunk being fixed-length data, it is determined whether or not the chunk is identical to another chunk. However, in this invention, a chunk to be used to verify data duplication may be a fixed-length one, or may be a variable-length one.

FIG. 9 is a diagram for illustrating an example of a configuration of the chunk management table 900.

The chunk management table 900 is a table for managing a chunk, which is a unit to be used in the deduplication processing to make a determination on the duplication of data strings.

A hash value 901 is a hash value of data of each chunk. The hash value 901 is used to detect duplication of chunks. The hash value is calculated by, for example, Secure Hash Algorithm (SHA)-1 or SHA-256. A storage LBA 902 is a logical address of the drive 209 constructing the RAID device 320 that stores the chunk. A chunk size 903 is the size of the chunk.

A reference count 904 is the number of chunks referred to through the deduplication. The reference count 904 is provided because the chunk may be shared by a plurality of logical addresses of a plurality of logical volume LUs 300. Specifically, the reference count 904 is incremented by one when the chunk is referred to from the address of the logical volume LU 300 through the deduplication processing, and the reference count 904 is decremented by one when the address of the logical volume LU 300 that has referred to the chunk no longer refers to the chunk. Further, there is no logical volume LU 300 referring to the chunk whose reference count 904 is "0", and hence this count can be used to determine whether or not the stored chunk can be eliminated from the drive 209.

In the chunk management table 900, hash values of both of unshared data stored in the unshared area 410 and shared data stored in the shared area 420 are recorded. It is preferred that identical pieces of data stored in both of the unshared area 410 and the shared area 420 be stored so that those pieces of data can be discriminated from each other. For example, different logical addresses of the drive 209 may be used in the unshared area 410 and the shared area 420, or a flag may be used for discrimination.

FIG. 10 is a diagram for illustrating an example of a configuration of the RAID device management table 1000.

The RAID device management table 1000 is a table for managing the RAID device registered with the thin provisioning pool 310. A RAID device number (RAID#) 1001 is a number for uniquely identifying the RAID device. A RAID level 1002 is configuration information on the RAID of the RAID device. For example, RAID level information, e.g., RAID 1+0, RAID 5, or RAID 6, is recorded as the RAID level 1002. A drive number 1003 is a number for identifying the drives 209 constructing the RAID.

The administrator can change the RAID device management table 1000 to change the configuration of the RAID through the management software executed by the management server 101.

Figure 11:
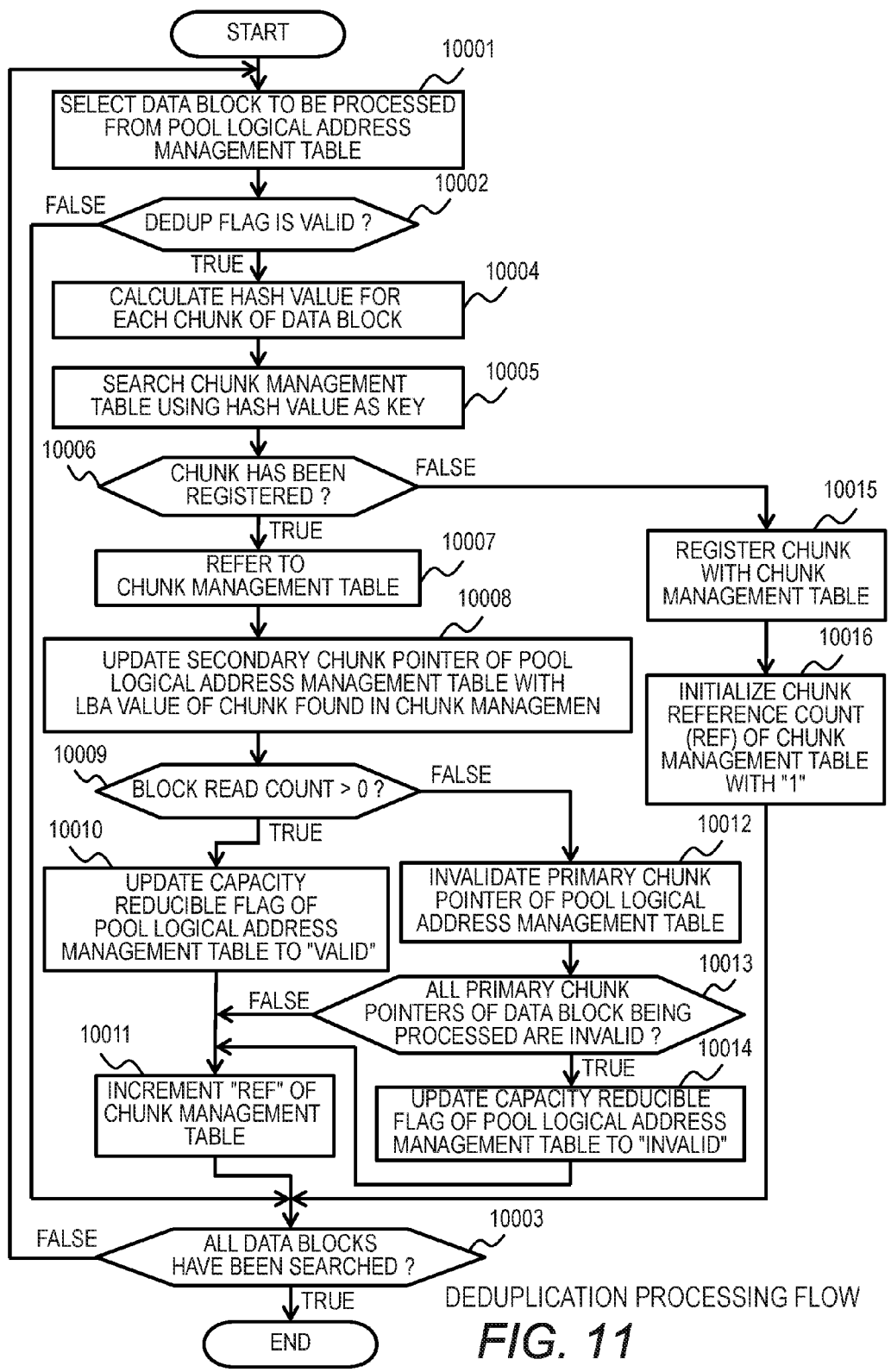
FIG. 11 is a flowchart for illustrating deduplication processing by the storage apparatus according to the first embodiment.

FIG. 11 is a flowchart for illustrating deduplication processing executed by the storage apparatus 200 according to the first embodiment.

The deduplication processing is executed by the CPU 201 of the storage apparatus 200 in accordance with the control software 210, and a subject of the operation is the CPU 201.

Figure 12:
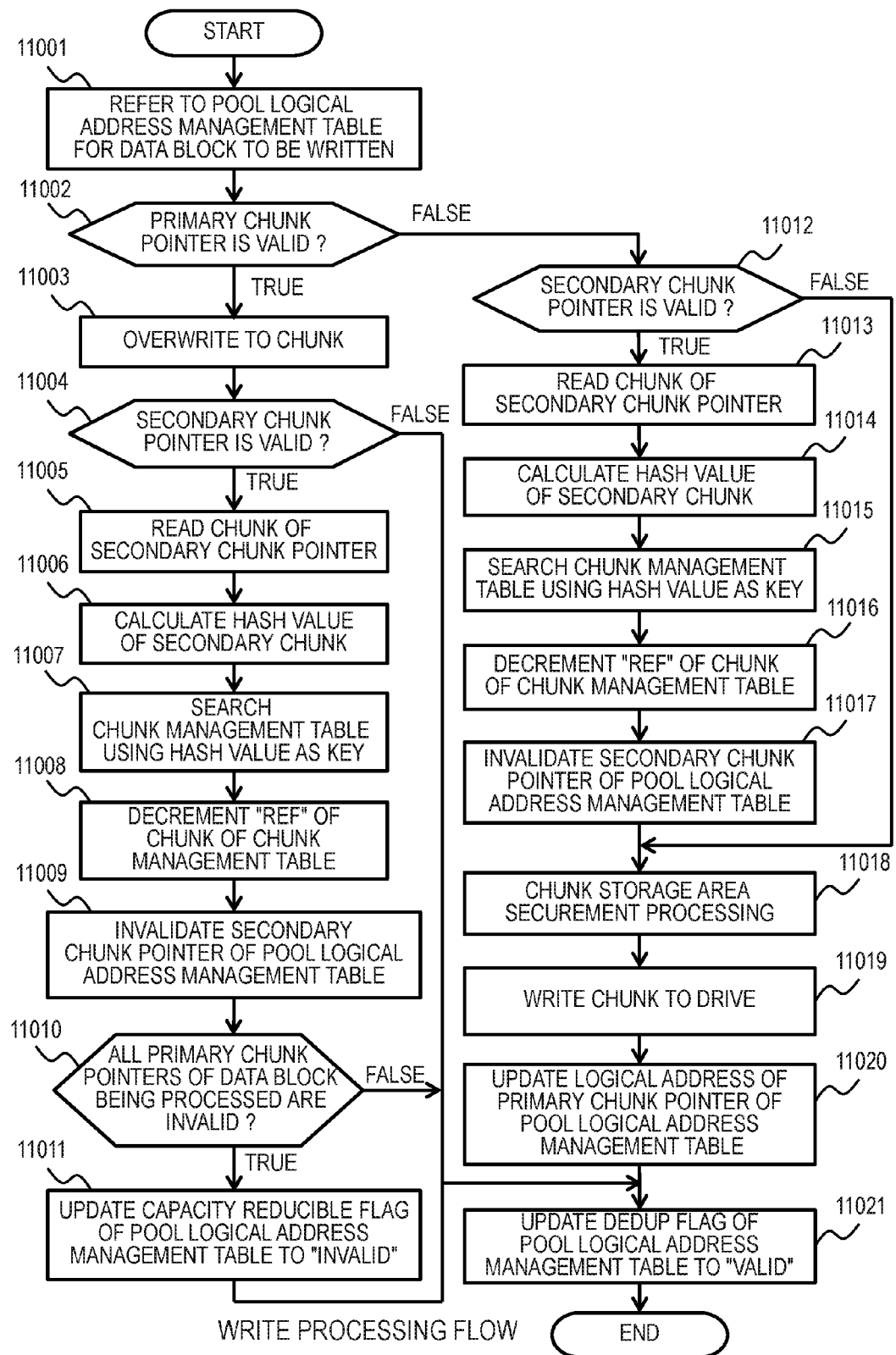
FIG. 12 is a flowchart for illustrating write processing by the storage apparatus according to the first embodiment.

In the first embodiment of this invention, the deduplication processing is executed asynchronously with I/O processing to/from the host computer 100 coupled to the storage apparatus 200. For example, the deduplication processing is executed when the load on the CPU 201 is low or after a set period of time has passed. The deduplication processing may be executed in synchronization with the I/O processing to/from the host computer 100. In this case, after processing of from Step 10002 to Step 10011 (determination in Step 10009 is "false") is executed, write processing illustrated in FIG. 12 is executed.

In Step 10001, the CPU 201 selects an arbitrary data block from the pool logical address management table 800. In Step 10002, the CPU 201 checks the dedup flag 802 indicating whether or not the data block has been deduplicated. When the dedup flag 802 is invalid, the CPU 201 determines that the relevant data block has been deduplicated, and does not execute the deduplication processing. Then, the processing proceeds to Step 10003.

On the other hand, when the dedup flag 802 is valid in Step 10002, in Step 10004, the CPU 201 calculates the hash value for each chunk of the data block. As an algorithm for calculating this hash value, for example, Secure Hash Algorithm (SHA)-1 or SHA-256 can be used. Next, the CPU 201 searches the chunk management table 900 for the hash value 901 using the hash value calculated in Step 10005 as a key, and the processing proceeds to Step 10006.

In Step 10006, when a chunk having the same hash value is found from the chunk management table 900, the CPU 201 determines that the relevant chunk is the duplicated chunk, and in Step 10008, updates the secondary chunk pointer 806 of the pool logical address management table 800 with the LBA 902 of the chunk having the same hash value that has been found in the chunk management table 900. Then, the processing proceeds to Step 10009.

In Step 10009, the CPU 201 refers to the pool logical address management table 800 to check the block read count 804 of the data block being processed. When the block read count 804 is one or more, the entire data block being currently processed has been read before being deduplicated, and the CPU 201 determines that the entire data block is highly likely to be read again even after being deduplicated. The CPU 201 then determines whether or not a chunk of this data block is identical to another chunk, and even when the chunk of this data block is identical to another chunk, holds the chunk on the drive 209 as it is without eliminating this chunk. In this manner, both the order of chunks on the logical addresses of the data block and the order of chunks on the drive are maintained. Next, in Step 10010, the CPU 201 updates the capacity reducible flag 803 to "valid", and the processing proceeds to Step 10011.

In Step 10009, it is determined whether or not the block read count 804 is 0, but it may be determined whether or not the entire data block is likely to be read in the future through use of a predetermined number of times other than 0 (e.g., 10 times) as a threshold.

On the other hand, when the determination in Step 10009 results in "false" (the block read count 804 is 0), the CPU 201 determines that the probability that the entire data block being currently processed is read after being deduplicated is low, and in Step 10012, invalidates the primary chunk pointer 805 of the pool logical address management table 800. Then, in Step 10013, the CPU 201 determines whether or not all the primary chunk pointers 805 of the data block being processed of the pool logical address management table 800 are invalid. When it is determined as a result that all the primary chunk pointers 805 are invalid, in Step 10014, the CPU 201 updates the capacity reducible flag 803 to "invalid", and the processing proceeds to Step 10011.

In Step 10011, the CPU 201 searches the chunk management table 900 to increment the reference count 904 having the same hash value by one. Then, the processing proceeds to Step 10003.

On the other hand, when a chunk having the same hash value is not found from the chunk management table 900 in Step 10006, in Step 10015, the CPU 201 registers the calculated hash value and the LBA of the chunk with the chunk management table 900. In Step 10016, the CPU 201 initializes the reference count of the chunk newly added to the chunk management table 900 with one. Then, the processing proceeds to Step 10003.

In Step 10003, when the CPU 201 does not search a part of the data blocks of the pool logical address management table 800, the processing returns to Step 10001. Then, the CPU 201 selects the next data block to be processed, and continues the processing. On the other hand, when all the data blocks of the pool logical address management table 800 have been searched, the CPU 201 ends the deduplication processing.

FIG. 12 is a flowchart for illustrating the write processing executed by the storage apparatus 200 according to the first embodiment.

Referring to FIG. 12, processing of writing data to the LU 300 by the host computer 100 is described. The write processing is executed by the CPU 201 of the storage apparatus 200 in accordance with the control software 210, and a subject of the operation is the CPU 201.

When the host computer 100 writes data to the LU 300, in Step 11001, the CPU 201 refers to the pool logical address management table 800 to select the data block and the chunk to which the data is to be written. The logical address of the LU 300 and the data block to which the data is to be written can be converted into each other by referring to the LU management table 500 and the LU logical address management table 600.

Next, in Step 11002, the CPU 201 refers to the pool logical address management table 800 to check the primary chunk pointer 805. Then, when the primary chunk pointer 805 is valid, the CPU 201 determines that the chunk being currently processed is not shared from another logical address, and the processing proceeds to Step 11003. On the other hand, when the primary chunk pointer 805 is invalid, the processing proceeds to Step 11012.

In Step 11003, the CPU 201 overwrites the storage address indicated by the primary chunk pointer 805 with new data written by the host computer 100. Then, the processing proceeds to Step 11004.

In Step 11004, the CPU 201 refers to the pool logical address management table 800 to check the secondary chunk pointer 806. Then, when the secondary chunk pointer 806 is valid, the processing proceeds to Step 11005, and the CPU 201 invalidates the secondary chunk pointer. This is because, as a result of overwriting the storage address indicated by the primary chunk pointer 805 with the new data written by the host computer 100 in Step 11003, the chunk of the drive 209 indicated by the primary chunk pointer 805 is different from the chunk of the drive 209 indicated by the secondary chunk pointer 806, and hence the secondary chunk pointer 806 needs to be invalidated. On the other hand, when the secondary chunk pointer 806 is invalid, the processing proceeds to Step 11021.

In Step 11005, the CPU 201 reads chunk data of the drive 209 indicated by the secondary chunk pointer, and in Step 11006, calculates the hash value. Then, in Step 11007, the CPU 201 searches the hash value 901 of the chunk management table 900 using the hash value calculated in Step 11006, and in Step 11008, decrements the reference count 904 of the chunk management table 900 corresponding to the chunk found through the search by one. In this case, in order to decrement the reference count of a secondary chunk, the hash value of the secondary chunk is used to search the hash value 901, but data of the logical address at which the secondary chunk is stored may be directly retrieved.

In Step 11009, the CPU 201 invalidates the secondary chunk pointer 806 of the pool logical address management table 800. Then, the processing proceeds to Step 11010.

In Step 11010, the CPU 201 determines whether or not all the primary chunk pointers 805 of the data block being processed of the pool logical address management table 800 are invalid. When all the primary chunk pointers 805 of the data block being processed of the pool logical address management table 800 are invalid, in Step 11011, the CPU 201 updates the capacity reducible flag 803 of the pool logical address management table 800 to "invalid". Then, the processing proceeds to Step 11021.

When it is determined in Step 11002 that the primary chunk pointer 805 is invalid, in Step 11012, the CPU 201 refers to the pool logical address management table 800 to check the secondary chunk pointer 806. Then, when the secondary chunk pointer 806 is valid, the processing proceeds to Step 11013, and the CPU 201 invalidates the secondary chunk pointer. On the other hand, when the secondary chunk pointer 806 is invalid, the chunk area being processed is invalid in both of the primary chunk and the secondary chunk. Thus, the CPU 201 determines that the data is to be newly written to the chunk area being processed, and the processing proceeds to Step 11018.

In Step 11013, the CPU 201 reads the chunk of the drive 209 indicated by the secondary chunk pointer, and in Step 11014, calculates the hash value of the secondary chunk. Then, in Step 11015, the CPU 201 searches the hash value 901 of the chunk management table 900 using the hash value calculated in Step 11014, and in Step 11016, decrements the reference count 904 of the chunk of the chunk management table 900 by one. Finally, in Step 11017, the CPU 201 invalidates the secondary chunk pointer 806 of the pool logical address management table 800, and the processing proceeds to Step 11018.

In Step 11018, the CPU 201 secures in the drive 209 a chunk storage area for storing a new chunk written by the host computer 100. In Step 11019, the CPU 201 writes the new chunk written by the host computer 100 into the area of the drive 209 secured in Step 11018. Then, the processing proceeds to Step 11020.

In Step 11020, the CPU 201 updates the primary chunk pointer 805 of the pool logical address management table 800 with the logical address of the drive 209 to which the data is written in Step 11019. Then, the processing proceeds to Step 11021.

In Step 11021, in order to set the data block being currently processed, which has been updated by the write processing by the host computer 100, as the target of the next deduplication processing, the CPU 201 updates the dedup flag 802 of the pool logical address management table 800 to "valid", and ends the processing.

Figure 13:
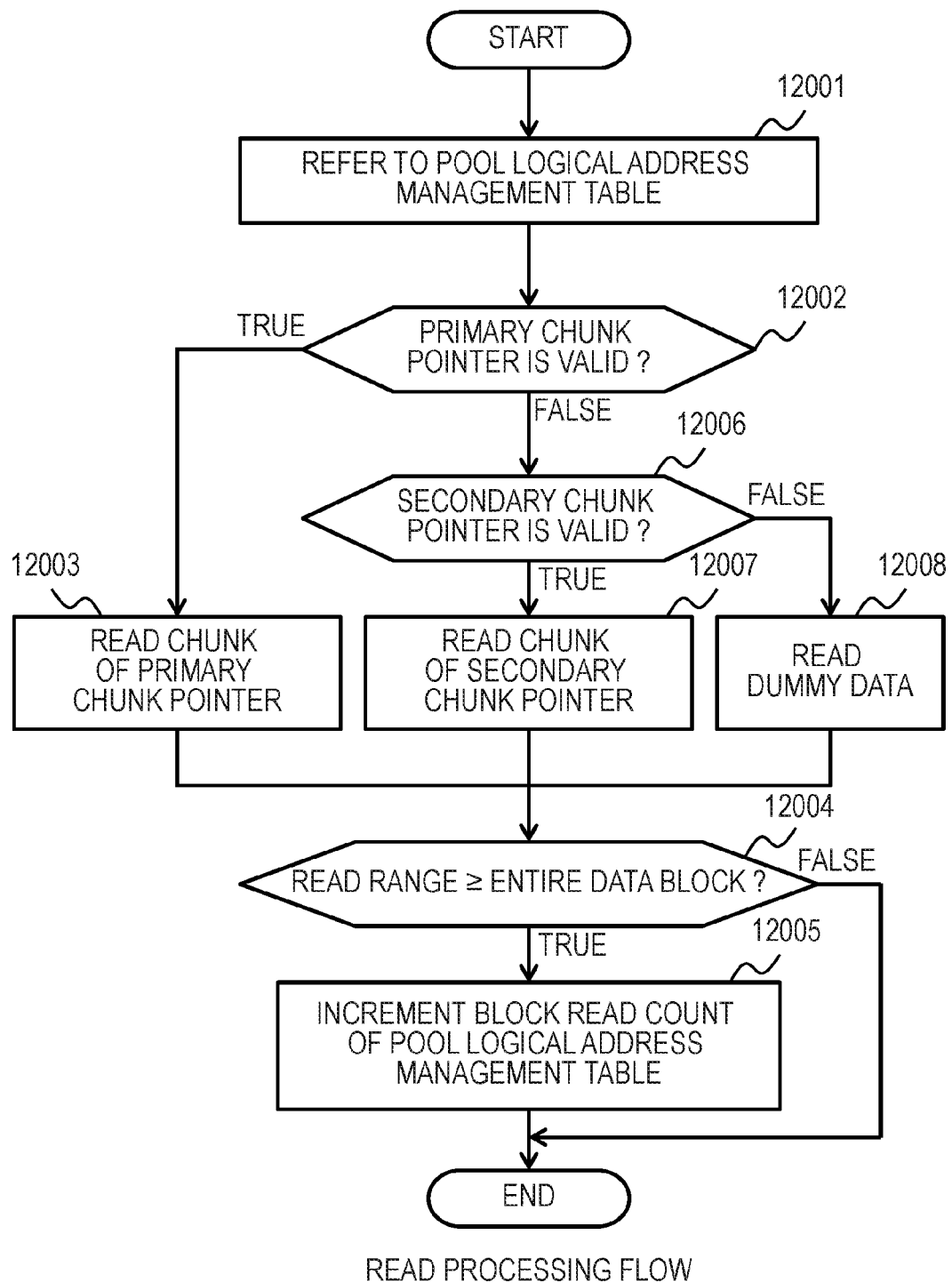
FIG. 13 is a flowchart for illustrating read processing by the storage apparatus according to the first embodiment.

FIG. 13 is a flowchart for illustrating read processing by the storage apparatus 200 according to the first embodiment.

Referring to FIG. 13, processing of reading data from the LU 300 by the host computer 100 is described. The read processing is executed by the CPU 201 of the storage apparatus 200 in accordance with the control software 210, and a subject of the operation is the CPU 201.

When the host computer 100 reads data from the LU 300, in Step 12001, the CPU 201 refers to the pool logical address management table 800 to select the data block and the chunk requested by the host computer 100 to be read. The logical address of the LU 300 and the data block from which the data is to be read can be converted into each other by referring to the LU management table 500 and the LU logical address management table 600, in the same manner as in the write processing.

In Step 12002, the CPU 201 refers to the pool logical address management table 800 for each chunk selected in Step 12001 to check the primary chunk pointer 805. Then, when the primary chunk pointer 805 is valid, in Step 12003, the CPU 201 reads chunk data from the logical address of the drive 209 indicated by the primary chunk pointer 805, and transmits the read chunk data to the host computer 100.

On the other hand, when the primary chunk pointer 805 is invalid, the processing proceeds to Step 12006, and the CPU 201 checks the secondary chunk pointer 806. When the secondary chunk pointer 806 is valid, the CPU 201 reads chunk data from the logical address of the drive 209 indicated by the secondary chunk pointer 806, and transmits the read chunk data to the host computer 100. On the other hand, when the secondary chunk pointer 806 is invalid in Step 12006, the host computer 100 reads an unallocated chunk area. Thus, the processing proceeds to Step 12008, and the CPU 201 transmits dummy data (e.g., data in which all pieces of data are zero) to the host computer 100.

In Step 12004, the CPU 201 determines whether or not the read range requested by the host computer 100 is equal to or wider than the entire data block. Then, when the read range is equal to or wider than the entire data block, the processing proceeds to Step 12005. Then, the CPU 201 increments the block read count 804 of the pool logical address management table 800 by one, and ends the read processing. On the other hand, when the read range is narrower than the entire data block, the CPU 201 ends the read processing without executing Step 12005.

In the deduplication processing according to this embodiment, as described above, in the data block whose block read count is equal to larger than a predetermined value, identical pieces of data of the drive 209 are left without eliminating the pieces of data by the deduplication processing, to thereby secure the sequential read performance. Therefore, in the deduplication processing according to this embodiment, as compared to a general deduplication method different from that of this embodiment, a consumption capacity of the drive 209 is larger, and the effect of deduplication is obtained at the time when the data before being deduplicated that has been left without being eliminated is invalidated.

Therefore, when the deduplication according to this embodiment is performed, as a current consumed storage capacity to be notified to the user, instead of the logical consumed capacity 313, a consumed capacity obtained when the data before being deduplicated is invalidated, which is calculated through calculation, is notified to the host computer 100 or the management server 101. With this configuration, as the storage system according to this application, a storage capacity reduction effect obtained through the application of deduplication can be presented to the user. Now, this calculation method is described.

Figure 14:
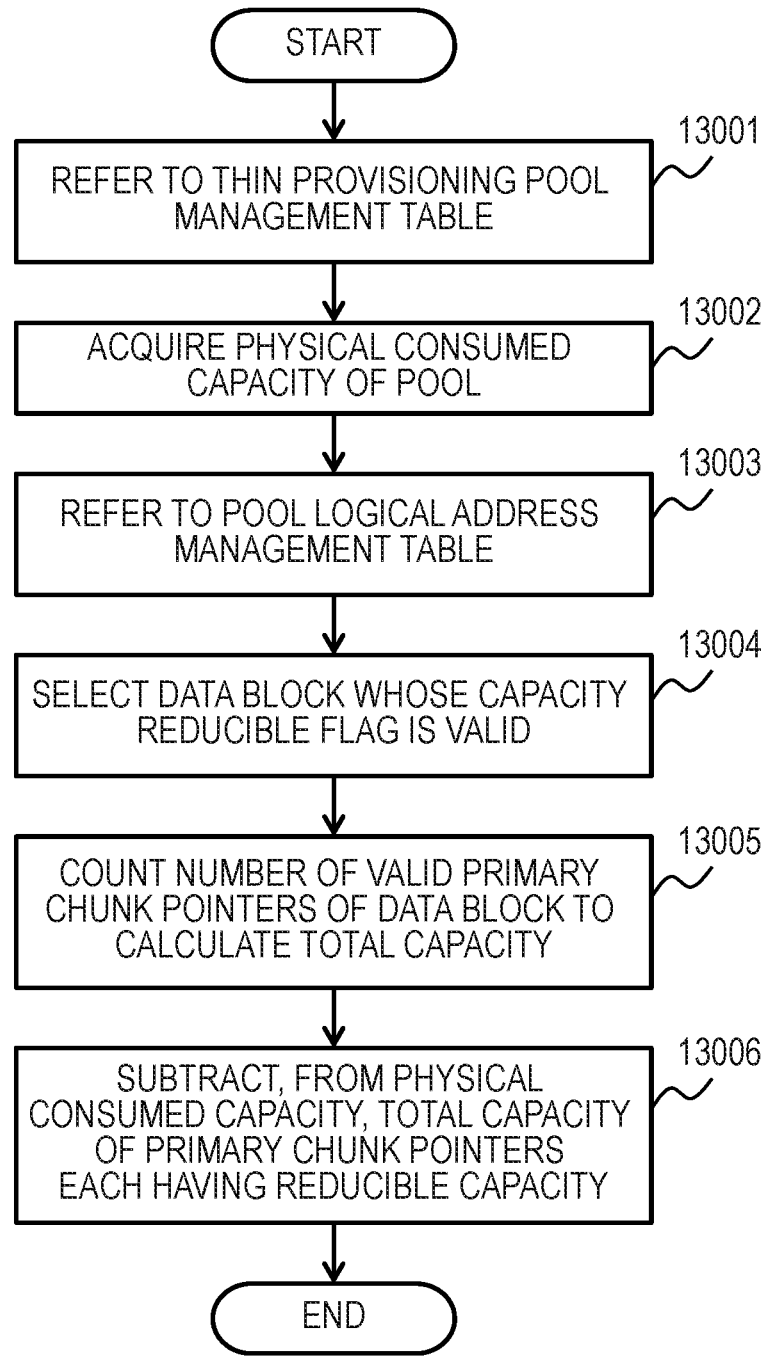
FIG. 14 is a flowchart for illustrating processing of calculating logical consumed capacity by the storage apparatus according to the first embodiment.

FIG. 14 is a flowchart for illustrating processing of calculating the logical consumed capacity 313 executed by the storage apparatus 200 according to the first embodiment. The pool consumed capacity calculation processing is executed by the CPU 201 of the storage apparatus 200 in accordance with the control software 210, and a subject of the operation is the CPU 201.

In Step 13001, the CPU 201 refers to the thin provisioning pool management table 700. In Step 13002, the CPU 201 acquires the physical consumed capacity 703 of the thin provisioning pool 310.

Next, in Step 13003, the CPU 201 refers to the pool logical address management table 800 in order to acquire a total capacity of chunks that can be eliminated out of the physical consumed capacity 703 of the thin provisioning pool 310. Then, in Step 13004, the CPU 201 selects the data block whose capacity reducible flag 803 is valid. Then, in Step 13005, the CPU 201 counts the number of valid primary chunk pointers of the data block selected in Step 13004 to calculate a total capacity of the valid primary chunk pointers. In Step 13006, the CPU 201 calculates, as the logical consumed capacity 313, a difference obtained by subtracting the total capacity calculated in Step 13005 from the physical consumed capacity 703 acquired in Step 13002.

As described above, a reducible amount of data of the primary chunk is subtracted from the physical consumed capacity of the thin provisioning pool to calculate the logical consumed capacity, and the calculated logical consumed capacity is output to the host computer 100 and the management server 101. Thus, the capacity reduction effect obtained through the deduplication can be presented accurately.

Further, even when it appears that there is a sufficient space in the allocated pool capacity 312 for the logical consumed capacity 313 calculated by the above-mentioned method, a physical chunk storage area may be depleted through storage of duplicated data, and hence a new chunk cannot be stored in the pool.

In order to prevent this depletion of the physical area, an area needs to be released on a regular basis from the data block whose capacity reducible flag 803 within the thin provisioning pool management table 700 is valid, to thereby secure an area for storing a new chunk. In view of this, an area of the data block whose block read count is small (that is, area that less affects performance) is released to minimize the influence on performance, to thereby secure the storage area.

Figure 15:
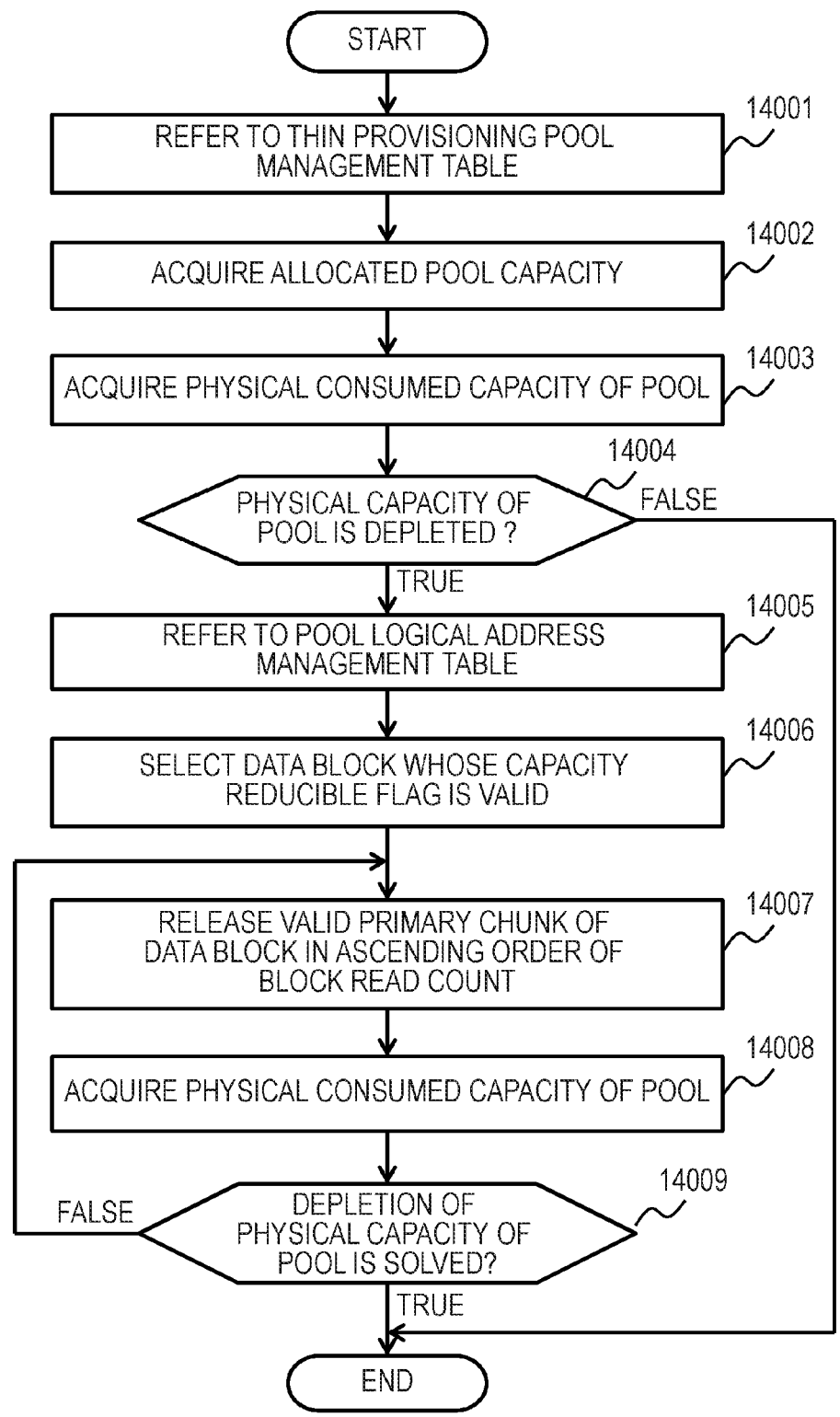
FIG. 15 is a flowchart for illustrating physical area release processing by the storage apparatus according to the first embodiment.

FIG. 15 is a flowchart for illustrating physical area release processing executed by the storage apparatus 200 according to the first embodiment. The physical area release processing is executed by the CPU 201 of the storage apparatus 200 in accordance with the control software 210, and a subject of the operation is the CPU 201.

In Step 14001, the CPU 201 refers to the thin provisioning pool management table 700. In Step 14002, the CPU 201 acquires the allocated pool capacity 312 of the thin provisioning pool 310. In Step 14003, the CPU 201 acquires the physical consumed capacity 703 of the pool. In Step 14004, the CPU 201 verifies whether or not the physical capacity of the pool is depleted. Specifically, when the physical consumed capacity 703 acquired in Step 14003 exceeds a predetermined proportion (e.g., 80%) of the allocated pool capacity 312 acquired in Step 13002, the CPU 201 releases the chunk of a physical area. The predetermined proportion to be used as the determination threshold in Step 14004 may be different for each thin provisioning pool. For example, when a plurality of thin provisioning pools (tiers) are constructed so as to correspond to the respective types of drives 209, the determination threshold may be changed for each type of drive 209. Further, this flow may be started at another timing, e.g., timing that is based on a predetermined schedule.

In Step 14005, the CPU 201 refers to the pool logical address management table 800. In Step 14006, the CPU 201 selects the data block whose capacity reducible flag 803 is valid.

In Step 14007, the CPU 201 sorts the data blocks selected in Step 14005 in ascending order of the block read count 804, and invalidates the primary chunk pointer in ascending order of the block read count 804 to release the primary chunk. In Step 14008, the CPU 201 acquires the physical consumed capacity 703. In Step 14009, the CPU 201 determines whether or not the depletion of the physical capacity is solved. When the depletion of the physical capacity is not solved, the processing returns to Step 14007 in order to further release the chunk. On the other hand, when the depletion of the physical capacity is solved, the CPU 201 ends the physical area release processing.

Through the processing described above, the depletion of the physical area of the pool is prevented.

In the above description, the primary chunk is released in Step 14007 in ascending order of the block read count 804, but another method may be employed as long as the primary chunk that less affects performance is released. For example, an arbitrary primary chunk pointer whose block read count 804 is smaller than a predetermined threshold may be released.

Through the area release processing described above, sufficient sequential read performance of the logical volume that has been deduplicated and effective use of the storage area can be achieved at the same time.

As described above, in the first embodiment of this invention, the controller 230 verifies, for each chunk of the drive 209, whether or not the chunk is identical to another chunk, and when the chunk is identical to the another chunk, the drive 209 holds the unshared data (primary chunk) associated only with the chunk and the shared data (secondary chunk) associated with the chunk and the another chunk. Thus, the number of times of access to the drive 209 required for reading the block is reduced, and hence the sequential read performance can be enhanced.

When a free capacity of the thin provisioning pool 310 becomes smaller, the controller 230 releases the storage area in which the primary chunk is stored. Thus, sufficient sequential read performance and effective use of the storage area can be achieved at the same time.

The controller 230 releases the primary chunk in ascending order of the block read count. Thus, the storage area can be used effectively while suppressing reduction in sequential read performance.

When a free capacity of the thin provisioning pool 310 becomes smaller, the controller 230 invalidates the pointer to the primary chunk to release the primary chunk. Thus, the need to verify data duplication again is eliminated, and hence processing at the time of depletion of a free capacity can be performed easily.

When the block read count is larger than the predetermined threshold, the controller 230 maintains the primary chunks held in consecutive storage areas. Thus, reduction in sequential read performance can be suppressed.

When all the primary chunks are released, the controller 230 updates the capacity reducible flag to "invalid". Thus, the need to verify data duplication again is eliminated, and hence processing at the time of depletion of a free capacity can be performed easily.

<Second Embodiment>

In the first embodiment, the method of deduplicating a data block is determined based on the information on access to the data block (block read count 804). However, for example, the host computer 100 or the management server 101 coupled to the storage apparatus may explicitly specify to the storage apparatus 200 the method of deduplicating a data block, to thereby switch the deduplication method. With this configuration, the deduplication method can be set in accordance with the administrator's intention.

When the file server 150 is arranged between the host computer 100 and the storage apparatus 200, the file server 150 may specify the method of deduplicating a data block based on information on access to each file managed by the file server 150. In this case, information for identifying data to which the deduplication according to this invention is to be applied is sent from the file server 150 to the storage apparatus 200.

As described above, in a second embodiment of this invention, in addition to the above-mentioned effects of the first embodiment, the deduplication method can be set in accordance with the state of access closer to the host computer 100, and hence performance of the entire system can be enhanced.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. A management method for a storage system, which is configured to read and write data in accordance with a request from a host computer,
the storage system including at least one controller including a processor configured to provide a logical volume having a plurality of storage areas to the host computer and to process reading and writing of the data, and a storage device configured to store the data to be read or written,
the storage device holding unshared data associated with one storage area and shared data associated with the plurality of the storage areas, the management method, which is executed by the at least one controller, comprising steps of:
determining whether first data of a predetermined storage area among the storage areas of the logical volume is duplicated to second data of another storage area among the storage areas of the logical volume;
performing control such that the storage device holds shared data associated with the first data of the predetermined storage area and the second data of the other storage area when the first data of the predetermined storage area is identical to the second data of the other storage area; and
determining to hold unshared data associated with the first data which is identical to the second data based on a condition of access to the first data,
wherein the data is accessed in units of data blocks, and
wherein the control is performed to execute one of holding both of the unshared data and the shared data in the storage device and holding only the shared data in the storage device according to an instruction issued by the host computer.

2. The management method according to claim 1, which is executed by the at least one controller, further comprising a step of:
determining not to hold unshared data associated with the first data which is identical to the second data when a free capacity of the storage device becomes smaller than a predetermined threshold.

3. The management method according to claim 1, which is executed by the at least one controller, further comprising steps of:
counting, for each of the data blocks within the storage device, a number of times the entire respective data block has been accessed to be read; and
performing control such that the storage device holds the unshared data associated with the first data of the predetermined storage area consecutively with a plurality of storage areas configuring the respective storage block when the counted number of times the entire respective data block corresponding to the first data has been accessed to be read is larger than a predetermined threshold.

4. The management method according to claim 1, which is executed by the at least one controller, further comprising a step of:
storing third data in a consecutive area to the first data in the predetermined storage area; and holding another unshared data associated with the third data in a consecutive area to the unshared data associated with the first data.

5. The management method according to claim 4,
wherein the third data is not associated with shared data in the other storage area.

6. The management method according to claim 1, which is executed by the at least one controller, further comprising the steps of:
holding unshared data associated with the first data of the predetermined storage area which is duplicated to the second data of the other storage area; and
releasing the first data when a free capacity of the storage device becomes smaller than a predetermined threshold.

7. The management method according to claim 6, which is executed by the at least one controller, further comprising steps of:
counting, for each of the data blocks within the storage device, a number of times the entire respective data block has been accessed to be read; and
releasing, when the free capacity of the storage device becomes smaller than the predetermined threshold, an area in which the unshared data associated with the first data constructing the data block is stored, in ascending order of the number of times the entire respective data block within the storage device has been accessed to be read.

8. The management method according to claim 6,
which is executed by the at least one controller, further comprising steps of:
counting, for each of the data blocks within the storage device, a number of times the entire respective data block has been accessed to be read;
releasing an area in which the unshared data associated with the first data of the predetermined storage area, which is identical to the second data of another storage area, is stored when the counted number of times the entire respective data block corresponding to the first data has been accessed to be read is smaller than the predetermined threshold; and
recording, for each of the data blocks, release of storage areas in which pieces of unshared data are stored when the storage areas in which the pieces of the unshared data associated with all storage areas constructing the respective data block are stored are released.

9. The management method according to claim 1, which is executed by the at least one controller, further comprising the steps of:
holding unshared data associated with the first data of the predetermined storage area; and
holding shared data associated with the first data of the predetermined storage area and the second data of the other storage area when the first data of the predetermined storage area is identical to the second data of the other storage area.

10. The management method according to claim 9, which is executed by the at least one controller, further comprising a step of:
outputting, as a consumed capacity of the storage device, a value obtained by subtracting a data amount of the unshared data from an amount of the data stored in the storage device.

11. A storage system, which is configured to read and write data in accordance with a request from a host computer, comprising:
at least one controller including a processor configured to provide a logical volume having a plurality of storage areas to the host computer and to process reading and writing of the data; and
a storage device configured to store the data to be read or written,
wherein the storage device is configured to hold unshared data associated with one storage area and shared data associated with the plurality of the storage areas,
wherein the at least one controller is configured to determine whether first data of a predetermined storage area among the storage areas of the logical volume is duplicated to second data of another storage area among the storage areas of the logical volume,
wherein the storage device is configured to hold shared data associated with the first data of the predetermined storage area and the second data of the other storage area when the first data of the predetermined storage area is identical to the second data of the other storage area,
wherein the at least one controller is configured to determine to hold unshared data associated with the first data which is identical to the second data based on a condition of access to the first data,
wherein the data is accessed in units of data blocks, and
wherein the at least one controller is configured to execute one of holding both of the unshared data and the shared data in the storage device and holding only the shared data in the storage device according to an instruction issued by the host computer.

12. The storage system according to claim 1, wherein the at least one controller is configured to determine not to hold unshared data associated with the first data which is identical to the second data when a free capacity of the storage device becomes smaller than a predetermined threshold.

13. The storage device according to claim 12, wherein the predetermined threshold is 20% of a capacity of the storage device.

14. The storage system according to claim 1,
wherein the at least one controller is configured to count, for each of the data blocks within the storage device, a number of times the entire respective data block has been accessed to be read, and
wherein the storage device is configured to hold the unshared data associated with the first data of the predetermined storage area consecutively with a plurality of storage areas configuring the respective data block when the counted number of times the entire respective data block corresponding to the first data has been accessed to be read is larger than a predetermined threshold.

15. The storage device according to claim 1,
wherein the at least one controller is configured to store third data in a consecutive area to the first data in the predetermined storage area, and
wherein the storage device is configured to hold another unshared data associated with the third data in a consecutive area to the unshared data associated with the first data.

16. The storage device according to claim 15,
wherein the third data is not associated with shared data in the other storage area.

17. The storage system according to claim 1, wherein that at least one controller is configured to:
hold unshared data associated with the first data of the predetermined storage area which is duplicated to the second data of the other storage area; and
release the first data when a free capacity of the storage device becomes smaller than a predetermined threshold.

18. The storage system according to claim 17, wherein the at least one controller is configured to:
count, for each of the data blocks within the storage device, a number of times the entire respective data block has been accessed to be read; and
release, when the free capacity of the storage device becomes smaller than the predetermined threshold, an area in which the unshared data associated with the first data constructing the data block is stored, in ascending order of the number of times the entire respective data block within the storage device has been accessed to be read.

19. The storage system according to claim 17, wherein the at least one controller is configured to invalidate a relation between the unshared data and the predetermined storage area associated with the unshared data, to thereby release the area in which the unshared data is stored when the free capacity of the storage device becomes smaller than the predetermined threshold.

20. The storage system according to claim 17, wherein the at least one controller is configured to:
count, for each of the data blocks within the storage device, a number of times the entire respective data block has been accessed to be read;
release an area in which the unshared data associated with the first data of the predetermined storage area, which is identical to the second data of another storage area, is stored when the counted number of times the entire respective data block corresponding to the first data has been accessed to be read is smaller than the predetermined threshold; and
record, for each of the data blocks, release of storage areas in which pieces of unshared data are stored when the storage areas in which the pieces of the unshared data associated with all storage areas constructing the respective data block are stored are released.

21. The storage system according to claim 1,
wherein the storage device is configured to:
hold unshared data associated with the first data of the predetermined storage area and hold shared data associated with the first data of the predetermined storage area and the second data of the other storage area when the first data of the predetermined storage area is identical to the second data of the other storage area.

22. The storage system according to claim 21, wherein the at least one controller is configured to output, as a consumed capacity of the storage device, a value obtained by subtracting a data amount of the unshared data from an amount of the data stored in the storage device.

\* \* \* \* \*